United States Patent Office 3,004,954
Patented Oct. 17, 1961

3,004,954
RESINOUS COMPOSITIONS COMPRISED OF A CROSS-LINKABLE ADDUCT OF COAL ACIDS AND A POLYFUNCTIONAL UREAL REACTANT
John L. Lang, Midland, Mich., assignor to The Dow Chemical Company, Midland, Mich., a corporation of Delaware
No Drawing. Filed Jan. 3, 1957, Ser. No. 632,269
6 Claims. (Cl. 260—70)

This invention relates to thermosetting, crosslinkable, resin-providing compositions that are comprised of certain urea and urea derivative adducts of coal acids and which are capable of being cured to resinous products having a pronounced utility for being employed in an adhesive capacity or as a binder material, or both.

It is among the principal objects of the invention to furnish thermosetting resin-providing compositions of certain urea and urea derivative adducts of polycarboxylic acids from the oxidation of coal and like carbonaceous materials.

It is also among the objects of the invention to furnish thermoset resin products from such compositions as well as integral, composite structures that utilize them.

Additional objects, purposes and advantages of the invention will be manifest in the following description and specification.

Accordingly, a thermosetting, cross-linkable, resin-providing composition is comprised of an adduct of (1) polycarboxylic acids from the oxidation of coal and like carbonaceous materials which, for convenience, are hereinafter referred to as coal acids and (2) a polyfunctional ureal reactant that advantageously, may be selected from the group consisting of urea, monomethylolurea, dimethylolurea, methyleneurea, methylolmethyleneurea, biuret, other alkaline reaction products of urea and formaldehyde that contain less than about ten condensed monomeric units in their molecules, alkaline reaction products of urea and difunctional 2 to 10 carbon atom aldehydes that contain less than about ten condensed monomeric units in their molecules, and mixtures thereof. The adduct may be prepared as a suitable resin-providing composition where it is obtained as the cross-linkable reaction product of between about 0.5 and 2.0 equivalent weights of the polyfunctional ureal reactant for each equivalent weight of the coal acids that is reacted, taking into account the polyfunctional nature of each of the reactant ingredients that form the adduct. Advantageously, the adduct may be made with about an equal number of equivalent weights of both the polyfunctional ureal reactant and the coal acids. Such stoichiometrically prepared adducts frequently may be found to have an optimum maximum potential for cross-linking and interaction upon subsequently being thermoset and cured.

In many instances it may be beneficial for the resin-providing adducts to contain minor proportions of a conventional polyamine curing agent therein to assist in their being thermoset and cured when they are subjected to heat at elevated thermosetting and curing temperatures. Hexamethylenetetramine is generally a satisfactory curing agent for the resin-providing adducts of the invention. Other functionally equivalent polyamines may also be utilized for this purpose, including ethylene diamine, diethylene triamine, triethylene tetramine and the like relatively lower molecular weight polyamines. Thus, as is apparent, the polyamines are alkyl amines that may contain from 2 to 4 or more amine groups in their molecule and may be comprised of alkylene units individually containing from 2 to about 6 carbon atoms. When a polyamine curing agent is incorporated in the resin-providing compositions of the invention it is usually suitable to employ it an amount up to about 25 percent and, advantageously, between about 3 and 12 percent by weight, based on the weight of the ureal coal acids adduct.

The cross-linkable, thermosetting adducts may be prepared by directly mixing the reactant ingredients together or, more advantageously in most instances, by conducting the reaction in a suitable solvent medium such as water, low-molecular weight alcohols and other non-reactive solvents for the reactant ingredients. The thermosetting adducts generally form at room temperatures due to the exothermic reaction that is involved. Hence, external application of heat in order to prepare them is usually not required. The adducts are generally water-insoluble solids that have an appearance which may range from that of a somewhat crystalline material to that of a somewhat glassy substance. They may be employed directly in the dry state for various purposes, including the fabrication of composite structures by intimately blending them with inert fillers and desired optional quantities of the curing catalyst prior to their being thermoset and cured. In this connection, it may often be an advantage to prepare the adducts directly in the presence of an inert filler (prior to thermosetting the thus-involved mass to a resin bonded composite structure) by simply intermixing the reactant ingredients for the adducts with the inert filler that is desired to be coalesced by the resinous product which is obtained upon curing of the adducts. The last mentioned technique may also be satisfactory when it is performed in the presence of a suitable solvent medium for the reactant ingredients.

The resin-providing adducts of the present invention may be thermoset and cured by actually heating them to a temperature between about 350 and 600° F. for a period of time between about two or three minutes and several seconds. As will be understood by those skilled in the art, curing atmospheres having higher curing temperatures may also be employed if appropriate compensating adjustment is made with respect to the curing time that is involved. In this connection, the particular thermosetting and curing conditions that are employed depend upon the configuration as well as the constitution of the particular composition that may be involved as well as upon the particular heating means and techniques that may be utilized. In any event, it is usually necessary to employ a temperature of at least about 350° F. in order to thermoset and cure the resin-providing ureal coal acids adducts.

The resin-providing ureal coal acids adducts of the invention and the resinous products to which they may be cured are especially desirable for employment in or as thermosetting adhesives, binders, molding powders, fillers and the like. In this capacity they may be utilized independently or in combination with other desired ingredients. Particular benefit, as indicated, may be derived when compositions that are in accordance with the present invention are employed as binders for the preparation of integral composite structures from various substances such as sand, glass fibers, synthetic fibers, mineral fibers, asbestos shorts and floats, mica flour, wood flour, granular carbonaceous fillers, particulate slags and other equivalent and analogous fibrous and discretely comminuted inert filler substances. Specifically, they may be employed with great advantage for the fabrication of various refractory structures such as shell molds, hot top devices and the like with sand and for resin-bonded glass fiber mats and panels. In such applications they may be substituted in about the same binding quantities that are ordinarily used for the resinous binder materials which are conventionally utilized for such purposes. The adducts may also be utilized to provide the adhesive constituent of plywood and the like laminate composite constructions.

The coal acids that are employed in the resin-providing compositions of the invention may be identical with or similar to those which may be obtained by the oxidation with gaseous oxygen, which may be contained in the air, of an aqueous alkaline slurry of a finely divided carbonaceous material selected from the group consisting of coal and coke that has been obtained by the carbonization of coal at temperatures beneath about 1300° F. Coal acids that have been obtained by means of a nitric acid oxidation of suitable carbonaceous materials are also, in general, found to be satisfactory. Such coals that are of the varieties known as anthacite, bituminous, sub-bituminous and lignite and other low grade coals are ordinarily suitable for the production of coal acids. Satisfactory cokes are those produced acording to conventional techniques from coal at a temperature beneath about 1300° F. The utilization of higher coking temperatures may frequently cause the cokes that are obtained to be graphitic and rendered unsuitable for conversion to coal acids in satisfactory yields.

The free coal acids product is a hygroscopic, usually yellowish, essentially water-soluble material which is believed to be substantially comprised of various aromatic polycarboxylic acids. The average molecular weight of the coal acids product that is ordinarily obtained is frequently in the neighborhood of 250. Their average equivalent weight is generally about 80. They usually appear to have an average of about two and one-half to five carboxylic groups per molecule with an apparent average of three to four being common. While their exact chemical nature and constitution may be somewhat conjectural, they evidently contain considerable quantities of tri- and tetra-carboxylic benzene acids as well as aromatic acids having more complex nuclei. Frequently, for example, the greatly preponderant proportions of aromatic nuclei obtained in coal acids prepared in the described fashion have been found to consist of methylnapthalene, benzene, biphenyl, naphthalene, phenanthrene, alkyl benzene, benzophenone and toluene nuclei.

The invention is further illustrated in and by the following examples wherein, unless otherwise indicated, all parts are to be taken by weight.

Example I

A cross-linkable, resin-providing adduct was prepared by reacting 9 parts of monomethylolurea and 9.4 parts of coal acids having an average molecular weight of about 250 in 100 parts of demineralized water. About 3.86 parts of the water-insoluble adduct which was formed as a precipitate in the reaction mass, after isolation therefrom, was intimately mixed with about 0.4 part of thoroughly pulverized hexamethylene tetramine and 60 parts of 120 mesh (U.S. Sieve Series) sand. About 10-400 cubic centimeter samples of the resulting mixture, in compacted form, were then heated at a temperature of about 500° F. for about one minute periods, during the latter half of which an open flame was played over the upper exposed surfaces of the sample mixtures. The sand in each sample was firmly bonded together to integral, composite structures by the thermoset monomethylolurea coal acids adduct.

Example II

An intimate mixture of about 3.0 grams of coal acids (M.W. 250), 2.0 grams of urea, 0.5 gram of finely divided hexamethylene tetramine and 78.3 grams of 120 mesh sand, formed in a compact mass, was heated at about 500° F. for one minute. A rigidly bonded, strong composite structure was obtained.

Example III

About 3.0 grams of coal acids (M.W. 250) and 2.0 grams of urea were dissolved in about 100 milliliters of demineralized water. The solution was then slurried with about 28.3 grams of 120 mesh sand before rendering the entire mass alkaline with ammonium hydroxide. An excessive quantity (about 15 grams) of 30 percent formaldehyde was then added and the resulting mass stirred. A resin-providing adduct precipitated out on the sand which was then isolated by filtration. The isolated sand was air dried to form a free-flowing, coated sand mixture. When it was compacted into a flat form and heated for one minute at 500° F. it formed a hard, strong, rigid and structurally stable resin-bonded sand body.

Example IV

To about 50 grams of dimineralized water there was added about 3.1 grams of coal acids (M.W. 250) and 3.4 grams of biuret. An excess of ammonium hydroxide was incorporated in the solution to render it alkaline with a pH of about 9. An excess of 30 percent formaldehyde (about 15 grams) was then mixed in the alkaline solution. Upon standing for about 2 hours, a precipitate formed which was filtered out of the reaction mass and dried. About a gram of the resulting dried adduct was ground with about 0.1 gram of hexamethylene tetramine and intimately mixed with 15 grams of 120 mesh sand. The mixture, in a flat form, was heated on a hot plate at 500° F. for about a minute. During the final 30 seconds of the heating an open flame was played on the surface of the formed mixture. A strong, rigid, well-knit, sand-resin body was thereby formed.

Other excellent binding resins were prepared by the foregoing procedures in which the equivalent weight ratio of the ureal reactant to coal acids was varied between about 0.7 and 1.5:1, respectively. Ureal reactants prepared with glutaraldehyde and the like may also be satisfactorily utilized in the manufacture of the coal acids resin.

It is to be understood that the purview of the invention is to be construed in the light of the hereto appended claims.

What is claimed is:

1. Thermosetting, resin-providing composition comprised of a cross-linkable adduct of about one equivalent weight of coal acids and between about 0.5 and about 2.0 equivalent weights of a polyfunctional ureal reactant selected from the group consisting of urea, monomethylolurea, dimethylurea, methyleneurea, methylolmethyleneurea, biuret, other alkaline catalyzed reaction products of urea and formaldehyde that contain less than about ten condensed monomeric units in their molecules, alkaline reaction products of urea and difunctional 2 to 10 carbon atom aldehydes that contain less than about ten condensed monomeric units in their molecules and mixtures thereof, said coal acids being the water-soluble mixed aromatic polymarboxylic acids that aer the products of the caustic oxidation of coal, which acids have an average molecular weight of about 250, an average equivalent weight of about 80, and contain an average of from about two and one-half to five carboxylic groups per aromatic nucleus in their molecule.

2. The composition of claim 1, wherein the adduct contains about an equal number of equivalent weight proportions of both the polyfunctional ureal reactant and coal acids in its molecule.

3. The composition of claim 1 and including therein up to about 25 percent by weight, based on the weight of the adduct, of a polyamine curing agent, that is an alkyl amine having from 2 to 4 amine groups in its molecule and consisting of 2 to 6 carbon atom alkylene units.

4. A thermoset resinous product comprising a cured composition in accordance with the composition set forth in claim 1.

5. Thermosetting mass for forming composite structures which consists of an inert filler substance with which there is intimately blended a binding proportion of a cross-linkable, resin-providing composition in accordance with the composition set forth in claim 1.

6. A composite structure that has been fabricated from thermosetting, resin-providing composition comprised of a cross-linkable adduct of about one equivalent weight of coal acids and between about 0.5 and about 2.0 equivalent weights of a polyfunctional ureal reactant selected from the group consisting of urea, monoethylolurea, dimethylurea, methyleneurea, methylolmethyleneurea, biuret, other alkaline catalyzed reaction products of urea and formaldehyde that contain less than about ten condensed monomeric units in their molecules, alkaline reaction products of urea and difunctional 2 to 10 carbon atom aldehydes that contain less than about ten condensed monomeric units in their molecules and mixtures thereof, said coal acids being the water-soluble mixed aromatic polycarboxylic acids that are the products of the caustic oxidation of coal, which acids have an average molecular weight of about 250, an average equivalent weight of about 80, and contain an average of from about two and one-half to five carboxylic groups per aromatic nucleus in their molecule.

References Cited in the file of this patent

UNITED STATES PATENTS

| | | |
|---|---|---|
| Re. 22,124 | Ellis | July 23, 1940 |
| 1,536,253 | Weber | May 5, 1925 |
| 2,208,580 | Hirsch | July 23, 1940 |
| 2,242,822 | Fuchs | May 20, 1941 |

OTHER REFERENCES

E. Wertheim: Textbook of Organic Chemistry, McGraw-Hill Book Co. Inc., N.Y., 3rd Ed., 1951, p. 171.